United States Patent [19]

Kothari

[11] Patent Number: 5,660,942

[45] Date of Patent: Aug. 26, 1997

[54] LEAK-PROOF RECHARGEABLE LEAD-ACID BATTERY CELL

[76] Inventor: Kishor Kothari, 111 Chittaranjan Avenue, Calcutta 700 073, India

[21] Appl. No.: 654,527

[22] Filed: May 29, 1996

[51] Int. Cl.$^6$ ..................................... H01M 2/12
[52] U.S. Cl. .................. 429/54; 429/82; 429/85; 429/177
[58] Field of Search ................... 429/53, 54, 72, 429/82, 85, 177

[56] References Cited

U.S. PATENT DOCUMENTS

| | | | |
|---|---|---|---|
| 3,994,749 | 11/1976 | Decker et al. | 429/53 |
| 4,360,573 | 11/1982 | Rao et al. | 429/72 |
| 5,026,616 | 6/1991 | Schumm | 429/177 X |
| 5,171,647 | 12/1992 | Dean et al. | 429/53 X |

*Primary Examiner*—Stephen Kalafut
*Attorney, Agent, or Firm*—David L. Davis

[57] ABSTRACT

A leak-proof rechargable lead-acid battery cell contains a passage in cooperation with a one-way valve which allows gas to escape from the interior of the battery cell when it exceeds a predetermined pressure. In addition, electrolyte can be replenished by extending a syringe needle through suitable apertures and piercing a self-sealing rubber plug.

5 Claims, 3 Drawing Sheets

LEAK-PROOF RECHARGEABLE LEAD-ACID BATTERY CELL

BACKGROUND OF THE INVENTION

This invention relates to a rechargeable lead acid battery cell and, more particularly, to such a battery cell which is leak-proof while allowing venting of gas from the cell and which is in a small housing of such size and shape and with terminal placement such that the inventive battery cell can be used as a replacement for conventional portable batteries, such as used, for example, in flashlights and the like.

There exists a need for an inexpensive rechargeable battery cell of the type which can be used in consumer appliances such as flashlights, portable radios, portable tape players, and the like. While effective, nickel-cadmium battery cells are expensive and also must be fully discharged before being recharged. At the present time, lead-acid batteries, such as the type used in automobiles, are relatively inexpensive and can be recharged at any point in their discharge cycle. However, such batteries contain an acidic electrolyte solution. For use in a consumer appliance, the battery cell must be designed to prevent the electrolyte solution from leaking out of the battery housing, irrespective of the orientation of the battery cell. Further, if a lead-acid battery is overcharged, the resultant heat causes gas to be generated which can cause the battery to explode. If the gas is allowed to vent to prevent such an explosion, the electrolyte solution must be replenished. It is therefore an object of the present invention to provide a leak-proof rechargeable lead-acid battery cell which also allows gas to be vented therefrom and the electrolyte solution to be replenished.

SUMMARY OF THE INVENTION

The foregoing and additional objects are attained in accordance with the principles of this invention by providing a battery cell comprising a generally cylindrical hollow plastic housing having an open end and a closed end. An electrode assembly is contained within the housing and includes a positive electrode plate, a negative electrode plate and an insulative absorbent separator plate between the positive and negative electrode plates. A quantity of acidic electrolyte solution is contained within the housing, and a plastic intermediate plate member is sealingly secured to the housing open end. The intermediate plate member has a gas passage aperture and a liquid passage channel, both in communication with the interior of the housing. A plastic cover plate member is sealingly secured to the housing open end, and is spaced from and outside the intermediate plate member. The cover plate member has a gas passage aperture therethrough and a liquid passage aperture therethrough. The liquid passage aperture of the cover plate member is in registry with the liquid passage channel of the intermediate plate member. A negative electrical terminal is secured to, and exposed at, the closed end of the housing. A positive electrical terminal is secured to, and exposed at, the cover plate member. The negative electrical terminal is connected to the negative electrode plate of the electrode assembly and the positive electrical terminal is connected to the positive electrode plate of the electrode assembly. A rubber plug is captively held in the space between the intermediate plate member and the cover plate member. The rubber plug is positioned to block the liquid passage channel and the liquid passage aperture. A one-way valve is provided in the space between the intermediate plate member and the cover plate member. The one-way valve blocks the gas passage aperture of the intermediate plate member and is arranged to allow gas to escape from the interior of the housing only when the pressure of the gas exceeds a predetermined pressure.

BRIEF DESCRIPTION OF THE DRAWINGS

The foregoing will be more readily apparent upon reading the following description in conjunction with the drawings in which like elements in different figures are identified by the same reference numeral and wherein.

DETAILED DESCRIPTION

Figure 1:
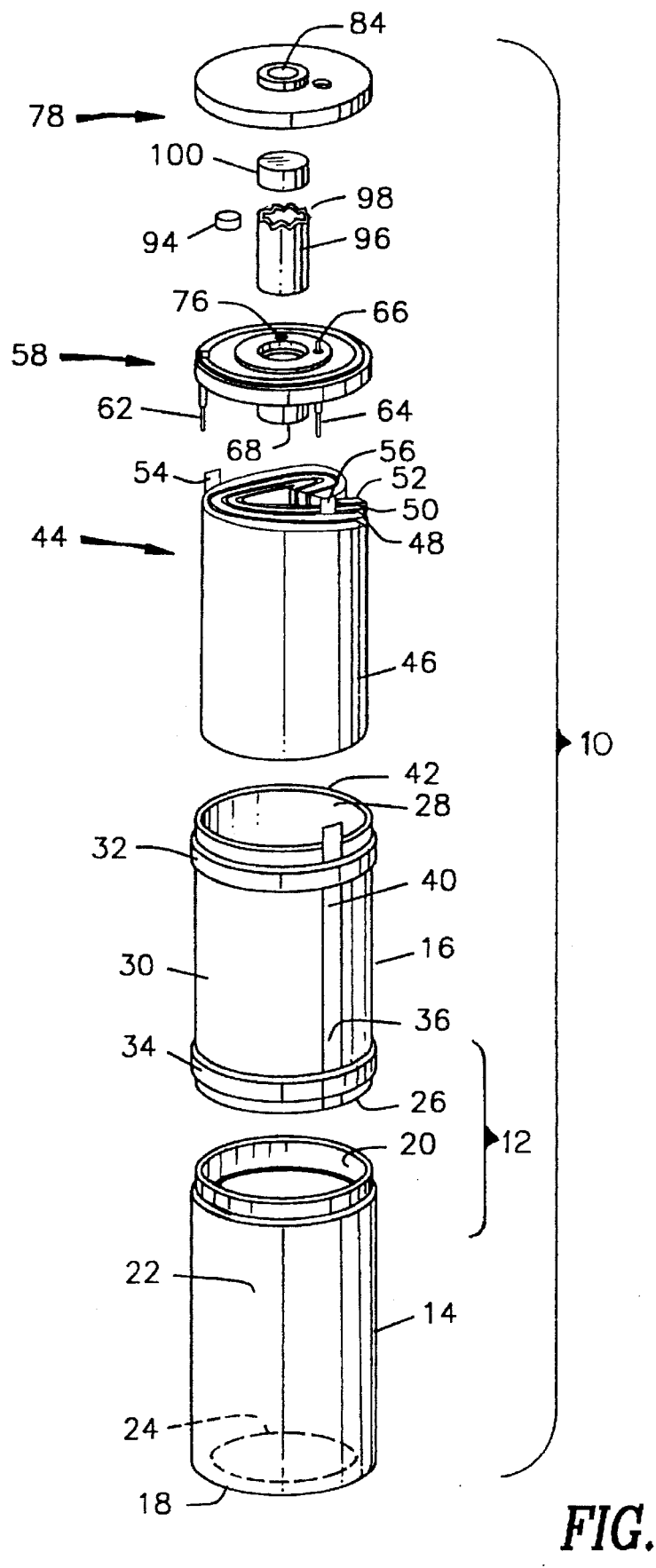
FIG. 1 is an exploded perspective view of a battery cell constructed in accordance with the principles of this invention.
Figure 2:
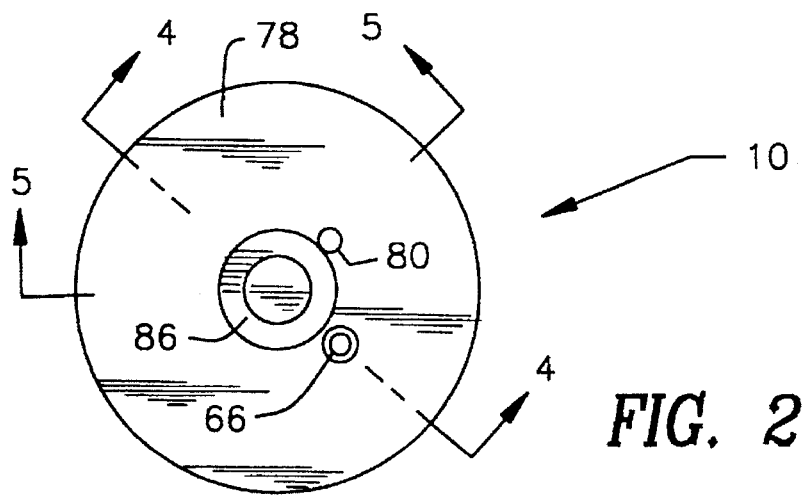
FIG. 2 is a top plan view of the battery cell of FIG. 1.
Figure 3:
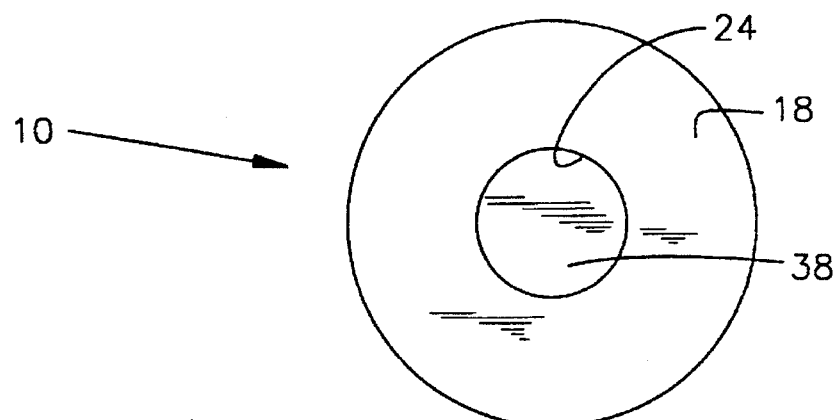
FIG. 3 is a bottom plan view of the battery cell of FIG. 1.
Figure 4:
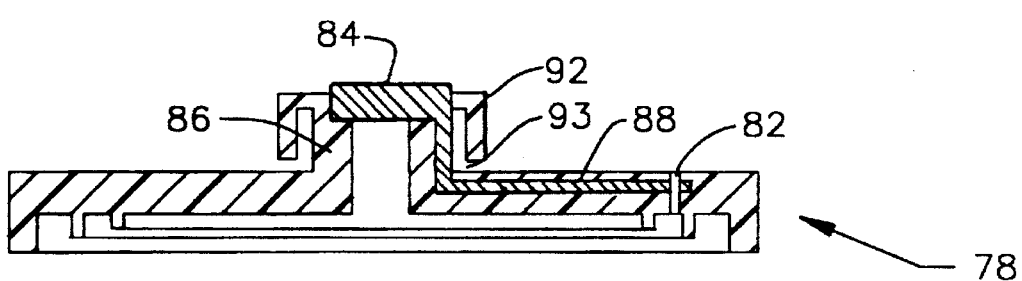
FIG. 4 is a cross sectional view of the cover plate member of the inventive battery cell taken along the line 4—4 in FIG. 2.
Figure 5:
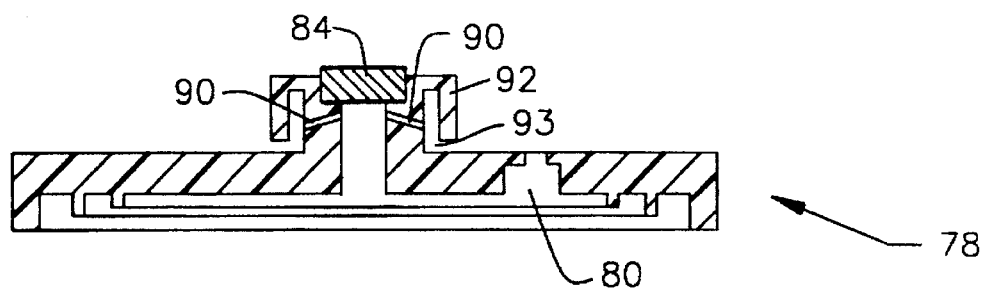
FIG. 5 is a cross sectional view of the cover plate member of the inventive battery cell taken along the line 5—5 in FIG. 2.
Figure 6:
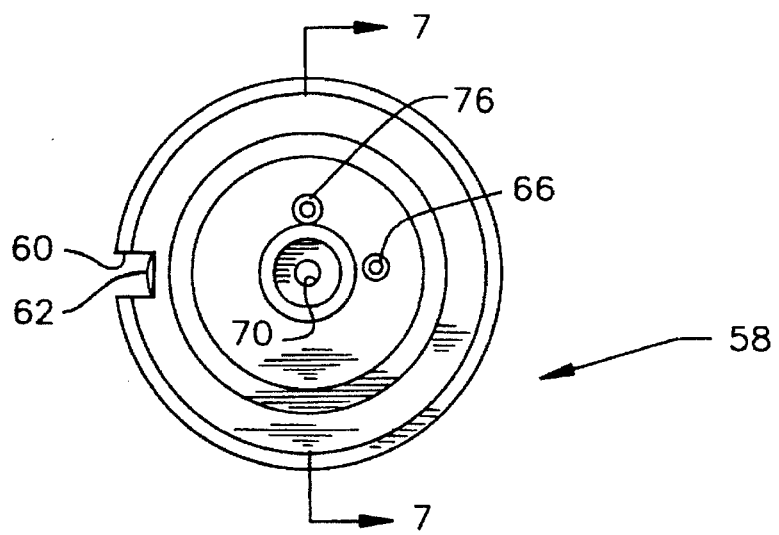
FIG. 6 is a top plan view of the intermediate plate member of the battery cell of FIG. 1.

Referring to the drawings, shown therein is a battery cell, identified generally by the reference numeral 10 and constructed in accordance with the principles of this invention. The battery cell 10 has a generally cylindrical hollow plastic housing 12 having an open end and a closed end which is made up of an outer plastic container 14 and an inner plastic container 16. The outer container 14 is generally cup-shaped with a bottom wall 18, an open end 20 and a generally cylindrical side wall 22 which extends between the bottom wall 18 and the open end 20. The bottom wall 18 is formed with an aperture 24, the function of which will be described hereinafter.

Like the outer container 14, the inner container 16 is generally cup-shaped with a bottom wall 26, an open end 28 and a generally cylindrical side wall 30 which extends between the bottom wall 26 and the open end 28. Surrounding the side wall 30, and formed integrally therewith, are a pair of peripheral flanges 32, 34.

The battery cell 10 includes a negative electrical terminal assembly 36, mounted to the outside of the inner container 16. The terminal assembly 36 has a first portion 38 which is generally circular and domed which fits against the bottom wall 2 6. A second portion 40 of the terminal assembly 36 is an elongated thin strip which passes through suitably formed and aligned openings in the flanges 32, 34 and extends above the open end 28 of the inner container 16.

The outer and inner containers 14, 16 are so sized that the outer container 14 slips over the inner container 16 and allows the first portion 38 of the negative electrical terminal assembly 36 to be exposed through the aperture 24 in the bottom wall 18. The side wall 22 of the outer container 14 is longer than the side wall 30 of the inner container 16 so that when the inner container 16 is within the outer container 14 the open end edge 42 of the inner container side wall 30 forms a ledge within the outer container 14, with the second portion 40 of the negative electrical terminal assembly 36 extending above that ledge but terminating short of the open end of the outer container 14. The inner and outer containers 16, 14 are sealed one to the other by solvent, ultrasonically, or in any other suitable fashion.

An electrode assembly 44 is held within the inner container 16. Preferably, the electrode assembly 44 includes four flexible sheets rolled into a coiled form. These sheets include a negative electrode plate 46, an insulative absorbent separator plate 48, a positive electrode plate 50, and an insulative absorbent separator plate 52. The separator plate 48 is between the negative and positive electrode plates 46, 50 and the separator plate 52 is outside and adjacent either the electrode plate 46 or the electrode plate 50. The negative electrode plate 46 is illustratively made of a lead-calcium-tin alloy. The positive electrode plate 50 is illustratively made of a low antimony-selenium alloy or a lead-calcium-tin alloy. The separator plates 48, 52 are illustratively made of absorbent glass mat (AGM), such as that manufactured by Hollingsworth & Vose Company of East Walpole, Mass. and sold under the trademark HOVOSORB®. A quantity of electolyte solution, illustratively dilute sulfuric acid of specific gravity in the range of 1250–1300, is placed within the inner container 16, and is absorbed by the separator plates 48, 52. A conductive tab 54 is connected to, and extends upwardly from, the negative electrode plate 46 and a conductive tab 56 is connected to, and extends upwardly from, the positive electrode plate 50.

A plastic intermediate plate member 58 is provided which fits within the outer container 14 and rests on the open end edge 42 of the inner container 16. The intermediate plate member 58 is formed with a notch 60 which cooperates with the exposed end of the second portion 40 of the negative terminal assembly 36 to properly locate the intermediate plate member 58. Embedded within the intermediate plate member 58 and extending downwardly therefrom is a negative post 62 which is exposed at its upper end within the notch 60. At its lower end, the negative post 62 is connected to the tab 54, as by a soldering operation. At its upper end within the notch 60, the negative post 62 is connected to the exposed end of the second portion 40 of the negative terminal assembly 36, as by a soldering operation. A positive post 64 is also embedded in the intermediate plate member 58 and extends downwardly therefrom, where it is connected to the tab 56, as by a soldering operation. The positive post 64 has an extension 66 which extends upwardly beyond the top surface of the intermediate plate member 58.

The intermediate plate member 58 has a central extension 68 which depends downwardly into the inner container 16. The central extension 68 is generally cup-shaped, is open to the top of the intermediate member 58 and has an aperture 70 through its bottom wall. Specifically, the interior of the central extension 68 is formed with two steps. The function of the central extension 68, with its aperture 70 and hollow interior, is to allow gas to escape from the inner container 16, as will be described hereinafter. To allow liquid to be added to the inner container 16, the intermediate plate member 58 is formed with a reservoir 72 and a pair of vertically separated openings 73, 74 providing communication between the reservoir 72 and the interior of the inner container 16. The lower opening 73 allows liquid to pass from the reservoir 72 into the interior of the inner container 16 and the upper opening 74 allows displaced gas from the interior of the inner container 16 to enter the reservoir 72. A passage 76 is open from the top of the reservoir 72 to the upper surface of the intermediate plate member 58. As shown, the passage 76 is formed with one step. The intermediate plate member 58 is sealed to the inner and outer-containers 16, 14 by solvents, ultrasonically, or in any other suitable fashion.

A plastic cover plate member 78 is also provided. The cover plate member 78 is sealed to the outer container 14 over, and spaced from, the intermediate plate member 58. The cover plate member is formed with an aperture 80 therethrough aligned with the passage 76 of the intermediate plate member 58. The cover plate member 78 is also formed with an aperture 82 therethrough which allows the extension 66 of the positive post 64 to pass therethrough. A positive terminal assembly is embedded in the cover plate 78 and has a first portion 84 exposed at the top of a central raised portion 86 of the cover plate member 78. A second portion 88 of the positive terminal assembly extends beneath the top surface of the cover plate member 78 to surround the aperture 82, where it is connected to the positive post extension 66, as by a soldering operation. The central raised portion 86 is hollow and is formed with one or more apertures 90 through its side wall to allow the passage of gas therethrough. To protect the apertures 90 from being blocked by dirt or the like, the cover plate member 78 is further formed with a cover member 92 surrounding the central raised portion 86 and extending downwardly therefrom, leaving a gap 93 above the top surface of the cover plate member 78 to allow passage of gas from the apertures 90 to the ambient. The cover plate member 78 is sealed to the outer container 14 by solvent, ultrasonically, or in any other suitable fashion.

The aperture 80 in the cover plate member 78 and the passage 76 in the intermediate plate member 58 are for the purpose of adding liquid to replenish electrolyte lost from the inner container 16 if the battery cell 10 is overcharged to the point where it heats up. To prevent unwanted liquid, as well as gas, from entering and/or leaving the inner container 16, a rubber plug 94 is provided, illustratively formed of neoprene rubber or some other suitable material. The rubber plug 94 fits in the stepped passage 76 and is captured between the top of the intermediate plate member 58 and the bottom of the cover plate member 78. To add liquid to the inner container 16, the liquid is placed in a syringe which is inserted into the aperture 80, piercing the rubber plug 94 and extending into the passage 76. Upon removal of the syringe, the rubber plug 94 reseals itself.

Figure 7:
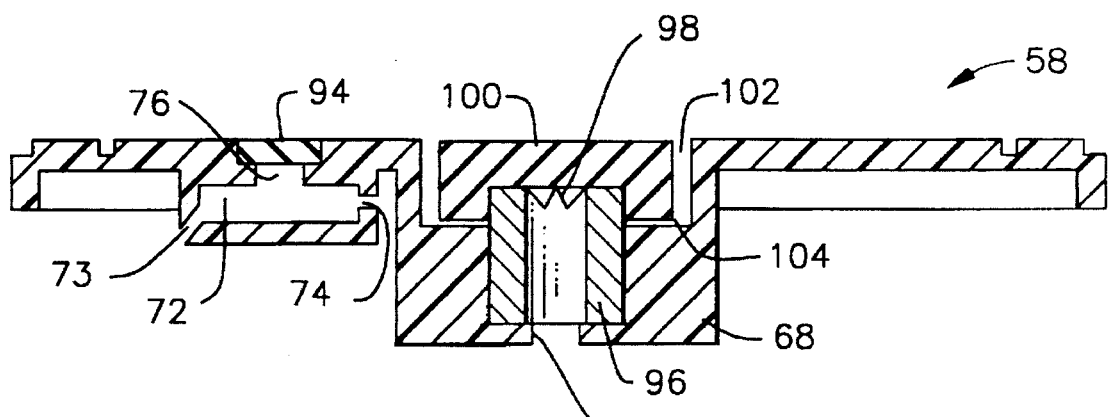
FIG. 7 is a cross sectional view of the intermediate plate member taken along the line 7—7 in FIG. 6.

To control the passage of gas into and out of the inner container 16, a one-way valve is provided. This one-way valve includes a plastic hollow tubular member 96 having a serrated top edge 98. A rubber cup 100, illustratively of neoprene rubber, is fitted over the top of the tubular member 96. The tubular member 96 fits within the hollow interior of the central extension 68 of the intermediate plate member 58 and rests on the lower step thereof, as best seen in FIG. 7. The rubber cup 100 is sized so that there is a gap 102 between its outer periphery and the inner wall of the interior of the central extension 68, as well as there being a gap 104 between the bottom of the rubber cup 100 and the upper step of the interior of the central extension 68. When the gas pressure within the inner container 16 exceeds a predetermined pressure, the gas passes through the serrations 98 to the inner wall of the rubber cup 100. This wall is then expanded by the gas pressure away from the exterior of the tubular member 96. Gas can then pass through the serrations 98, between the interior of the rubber cup 100 and the exterior of the tubular member 96, through the gaps 104 and 102, into the space between the intermediate plate member 58 and the cover plate member 78, into the hollow interior of the central raised portion 86 of the cover plate member 78, through the apertures 90, and through the gap 93 to the ambient.

The plastic material forming the outer container 14, the inner container 16, the intermediate plate member 58, the cover plate member 78 and the hollow tubular member 96 may be ABS, high impact polystyrene, SAN, or some other suitable plastic material. The posts 62, 64 may be formed of a lead-calcium-tin alloy or some other suitable material. The positive and negative terminal assemblies may be formed of brass coated with tin or silver. They can also be made of stainless steel of suitable grade.

The aforedescribed battery cell possesses a number of advantages. For example, it is inexpensive to manufacture. It is also interchangeable with standard battery cells, having a positive terminal at one end and a negative terminal at the other end. Further, electrolytes cannot leak from the interior of the cell due to the sealing effect provided by the rubber plug 94 and the rubber cup 100, in addition to the electrolye being absorbed by the separator plates. Still further, in the event of overcharging of the battery cell, gas can escape to prevent explosion of the cell. When there is such overcharging and it is desired to replenish the electrolyte, water can be added through the resealable rubber plug.

Accordingly, there has been disclosed an improved leak-proof rechargeable lead-acid battery cell. While an illustrative embodiment of the inventive battery cell has been disclosed herein, it is understood that various modifications to the disclosed embodiment may be made and it is intended that this invention be limited only by the scope of the appended claims.

What is claimed is:

1. A battery cell comprising:

a substantially cylindrical hollow plastic housing having an open end and a closed end;

a negative electrical terminal secured to, and exposed at, the closed end of the housing;

an electrode assembly within the housing, the electrode assembly having a positive electrode plate, a negative electrode plate and an insulative absorbent separator plate between the positive and negative electrode plates;

a quantity of acidic electrolyte solution within the housing;

a plastic intermediate plate member sealingly secured to the housing open end, the intermediate plate member having a gas passage aperture and a liquid passage channel both in communication with the interior of the housing;

a plastic cover plate member sealingly secured to the housing open end spaced from and outside the intermediate plate member, the cover plate member having a gas passage aperture therethrough, the cover plate member further having a liquid passage aperture therethrough in registry with the liquid passage channel of the intermediate plate member;

a positive electrical terminal secured to, and exposed at, the cover plate member;

means for connecting the negative electrical terminal to the negative electrode plate of the electrode assembly;

means for connecting the positive electrical terminal to the positive electrode plate of the electrode assembly;

a rubber plug captively held in the space between the intermediate plate member and the cover plate member, the rubber plug being positioned to block the liquid passage channel and the liquid passage aperture; and a one-way valve in the space between the intermediate plate member and the cover plate member, the one-way valve blocking the gas passage aperture of the intermediate plate member and arranged to allow gas to escape from the interior of the housing.

2. A leak-proof rechargeable battery cell comprising:

a cup-shaped inner plastic container having a bottom wall, an open end and a substantially cylindrical side wall extending between said bottom wall and said open end;

a negative electrical terminal assembly mounted to the outside of said inner container, said negative terminal assembly having a first portions adjacent said bottom wall and an elongated second portion extending from said first portion along said side wall and terminating beyond said open end;

a cup-shaped outer plastic container having a bottom wall, an open end and a substantially cylindrical side wall extending between said outer container bottom wall and said outer container open end, said outer container being sized to slip over said inner container with the inner container bottom wall being adjacent the outer container bottom wall and the outer container open end extending beyond the inner container open end so that the open end edge of the inner container side wall forms a ledge within the outer container, the outer container bottom wall being formed with an aperture to expose the negative terminal assembly first portion, the outer container and the inner container being sealed one to the other;

an electrode assembly within said inner container, said electrode assembly having a positive electrode plate, a negative electrode plate and an insulative absorbent separator plate between the positive and negative electrode plates;

a quantity of acidic electrolyte solution within said inner container;

a plastic intermediate plate resting on said ledge and sealed thereto, said intermediate plate having a central extension depending downwardly into the inner container, said central extension being generally cup-shaped, open to the top of said intermediate plate and having an aperture through its bottom wall to allow the passage of gas from the inner container, said intermediate plate being further formed with a channel for allowing liquid to be placed in the inner container;

one-way valve means disposed in said central extension of said intermediate plate for allowing gas to escape from the inner container;

a negative post extending through said intermediate plate and being sealed thereto, said negative post being connected at a first end to said negative electrode plate and at a second end to said negative terminal assembly second portion;

a positive post extending through said intermediate plate and being sealed thereto, said positive post being connected at a first end to said positive electrode plate with the second end of said positive post extending above said intermediate plate;

a plastic cover plate sealed to the outer container over the intermediate plate, the cover plate having a first aperture therethrough to allow the passage of gas, the cover plate further having a recess in its lower surface with a second aperture aligned with the intermediate plate channel extending through the upper surface of the cover plate, the cover plate also having a central raised portion;

a positive electrical terminal assembly secured to said cover plate, said positive terminal assembly having a first portion exposed above said cover plate central raised portion and a second portion connected to the second end of said positive post; and a rubber plug disposed in the channel of the intermediate plate and in the recess of the cover plate.

3. The battery cell according to claim 2 wherein said one-way valve means includes:

a hollow tubular member having a serrated top edge, the interior of said tubular member being in communication with the bottom wall aperture of said intermediate plate central extension; and a rubber cup fitted over the top of said tubular member.

4. The battery cell according to claim 2 wherein said intermediate plate channel includes a reservoir communicating with the upper surface of said intermediate plate and with the interior of said inner container.

5. The battery cell according to claim 2 wherein the central raised portion of the cover plate is formed with a recess open to the lower surface of the cover plate and the first aperture of the cover plate extends through a side wall and into the recess of the central raised portion, the cover plate further having a cover member surrounding the central raised portion and extending from the top of the central raised portion to below the first aperture, the cover member allowing the passage of gas from the first aperture to the ambient.

* * * * *